United States Patent
Chang et al.

(10) Patent No.: US 12,490,234 B2
(45) Date of Patent: Dec. 2, 2025

(54) WIRELESS CONNECTION CONTROL METHOD AND USER EQUIPMENT

(71) Applicant: Sharp Kabushiki Kaisha, Osaka (JP)

(72) Inventors: Ningjuan Chang, Shanghai (CN); Renmao Liu, Shanghai (CN); Lei Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 339 days.

(21) Appl. No.: 18/031,169

(22) PCT Filed: Oct. 9, 2021

(86) PCT No.: PCT/CN2021/122802
§ 371 (c)(1),
(2) Date: Apr. 11, 2023

(87) PCT Pub. No.: WO2022/078256
PCT Pub. Date: Apr. 21, 2022

(65) Prior Publication Data
US 2023/0388967 A1    Nov. 30, 2023

(30) Foreign Application Priority Data
Oct. 14, 2020   (CN) .......................... 202011099854.1

(51) Int. Cl.
*H04W 68/02*   (2009.01)
*H04W 76/40*   (2018.01)

(52) U.S. Cl.
CPC ........... *H04W 68/02* (2013.01); *H04W 76/40* (2018.02)

(58) Field of Classification Search
CPC ..... H04W 68/02; H04W 76/40; H04W 76/11; H04W 76/25; H04W 76/27
See application file for complete search history.

(56) References Cited

U.S. PATENT DOCUMENTS

| | | | |
|---|---|---|---|
| 10,020,953 B2 * | 7/2018 | Kim | H04W 72/30 |
| 2006/0104225 A1 * | 5/2006 | Kim | H04L 12/189 |
| | | | 370/313 |
| 2019/0261140 A1 * | 8/2019 | Fujishiro | H04W 24/08 |
| 2020/0351720 A1 * | 11/2020 | Chin | H04W 36/0007 |

(Continued)

FOREIGN PATENT DOCUMENTS

| | | | | |
|---|---|---|---|---|
| CN | 114375072 A | * | 4/2022 | ............ H04W 76/40 |
| EP | 4120792 A1 | * | 1/2023 | .............. H04W 4/06 |

OTHER PUBLICATIONS

Babaei U.S. Appl. No. 63/076,704, part 1, filed Sep. 10, 2020 (Year: 2020).*

(Continued)

*Primary Examiner* — Wutchung Chu
(74) *Attorney, Agent, or Firm* — Keating & Bennett, LLP

(57) ABSTRACT

Provided in the present disclosure are a wireless connection control method and user equipment. The wireless connection control method includes: user equipment (UE) receiving indication information including one or more multicast and broadcast service (MBS) services; the UE determining, on the basis of the indication information, whether an MBS service of interest to the UE is present; and if an MBS service of interest to the UE is present, the UE triggering a radio resource control (RRC) connection establishment/resume procedure.

2 Claims, 2 Drawing Sheets

(56) References Cited

U.S. PATENT DOCUMENTS

| | | | | |
|---|---|---|---|---|
| 2020/0389900 | A1* | 12/2020 | Lee | H04W 72/53 |
| 2021/0345438 | A1* | 11/2021 | Dao | H04W 76/34 |
| 2022/0015063 | A1* | 1/2022 | Byun | H04W 76/40 |
| 2022/0322291 | A1* | 10/2022 | Wang | H04W 4/06 |
| 2023/0011492 | A1* | 1/2023 | Åkesson | H04W 76/40 |
| 2023/0199805 | A1* | 6/2023 | Liu | G06Q 10/06395 |
| | | | | 370/312 |
| 2023/0276203 | A1* | 8/2023 | Sebire | H04W 4/06 |
| | | | | 370/312 |
| 2023/0370905 | A1* | 11/2023 | Babaei | H04W 36/0007 |
| 2023/0388967 | A1* | 11/2023 | Chang | H04W 76/25 |

OTHER PUBLICATIONS

Babaei U.S. Appl. No. 63/076,704, part 2, filed Sep. 10, 2020 (Year: 2020).*

Official Communication issued in International Patent Application No. PCT/CN2021/122802 mailed on Jan. 6, 2022.

"3rd Generation Partnership Project; Technical Specification Group Core Network and Terminals; Non-Access-Stratum (NAS) protocol for 5G System (5GS); Stage3; (Release 16)", 3GPP TS 24.501, V16.6.0, Sep. 2020, pp. 1-804.

Sa6, "New SID Study on Mission Critical services over 5G multicast-broadcast system", 3GPP TSG-SA Meeting #85, SP-190724, Sep. 17-20, 2019, 3 pages.

Huawei, "New Work Item on NR support of Multicast and Broadcast Services", 3GPP TSG RAN Meeting #86, RP-193248, Dec. 9-12, 2019, 5 pages.

Ericsson, "NR Multicast in Idle and Inactive mode", 3GPP TSG-RAN WG2 #111e, R2-2007262, Aug. 17-28, 2020, 1-6 pages.

Huawei et al., "Idle/Inactive UE support for NR MBS", 3GPP TSG-RAN WG2 Meeting #111-e, R2-2007029, Aug. 17-28, 2020, 6 pages.

Vivo, "Discussion on idle and inactive mode UEs", 3GPP TSG-RAN WG2 Meeting #111 electronic E-Meeting, R2-2007037, Aug. 17-28, 2020, 5 pages.

* cited by examiner

WIRELESS CONNECTION CONTROL METHOD AND USER EQUIPMENT

TECHNICAL FIELD

The present disclosure relates to the technical field of wireless communications. More specifically, the present disclosure relates to a wireless connection control method and corresponding user equipment.

BACKGROUND

A new radio access technology (new RAT, NR) multicast and broadcast service (MBS) work item (see non-patent literature: RP-193248: New WID: NR Multicast and Broadcast Service) was approved in the 3rd Generation Partnership Project (3GPP) RAN #86 plenary session held in December 2019. One of the work objectives of the corresponding research project (see SP-190726) in SA2 (referred to as Objective A in SA2) is to enable MBS services to be supported in a 5G system (5GS), including public safety, V2X applications, IPTV, group communications, Internet of Things applications, etc. The NR MBS work items in the RAN aim to provide the support or capabilities required in a radio access network (RAN) to achieve the above objectives in SA2. One of the specific work items is to define a corresponding transmission mechanism and scheduling mechanism for UEs in a radio resource control connected state RRC_CONNECTED, so that the UEs can receive broadcast/multicast services.

The present disclosure discusses relevant problems involved in achieving the above work objectives.

SUMMARY

The objective of the embodiments of the present disclosure is to solve the problem of wireless connection control for an MBS in an NR system. More specifically, the present disclosure presents a solution to the problem of how to implement a radio resource control (RRC) connection establishment/resume procedure when UE enters an RRC connected state to receive high-reliability MBS services. Provided in the embodiments of the present disclosure are a wireless connection control method performed by user equipment and corresponding user equipment.

According to a first aspect of the present disclosure, provided is a wireless connection control method, comprising: user equipment (UE) receiving indication information comprising one or more multicast and broadcast service (MBS) services; the UE determining, on the basis of the indication information, whether an MBS service of interest to the UE is present; and if an MBS service of interest to the UE is present, the UE triggering a radio resource control (RRC) connection establishment/resume procedure.

In the wireless connection control method according to the first aspect, an RRC layer of the UE may trigger the RRC connection establishment/resume procedure autonomously, and the UE selects a predefined specific value as an access type, and performs an access control UAC procedure by using the access type.

In the wireless connection control method according to the first aspect, the predefined specific value may be 0.

In the wireless connection control method according to the first aspect, alternatively, an RRC layer of the UE submits the received indication information and an identifier of the one or more MBS services to a non access stratum (NAS) layer; the NAS layer initiates a NAS connection procedure, and requests or instructs the RRC layer to initiate the RRC connection establishment/resume procedure; and upon receiving the request or instruction from the NAS layer, the RRC layer initiates the RRC connection establishment/resume procedure.

In the wireless connection control method according to the first aspect, when initiating the RRC connection establishment/resume procedure, the RRC layer may select an access type provided by the NAS layer, and perform an access control UAC procedure by using the access type.

In the wireless connection control method according to the first aspect, the identifier of the one or more MBS services submitted by the RRC layer of the UE to the NAS layer is an identifier of the MBS service of interest to the UE.

In the wireless connection control method according to the first aspect, the UE receives a paging message, and if an MBS service identifier in the paging message comprises an MBS service of interest to the UE, the UE initiates the RRC connection establishment/resume procedure; or, the UE receives a change notification, and if an MBS service identifier corresponding to corresponding information or bits in the change notification identifies an MBS service of interest to the UE, the UE initiates the RRC connection establishment/resume procedure; or, the UE receives broadcast signaling, and if a list of MBS services required to be received in an RRC connected state indicated in the broadcast signaling comprises an identifier of an MBS service of interest to the UE, the UE initiates the RRC connection establishment/resume procedure.

In the wireless connection control method according to the first aspect, when the RRC layer of the UE receives a paging message comprising one or more MBS service identifiers, and if the RRC state of the UE is an RRC_INACTIVE state, the UE performs an operation of entering an RRC_IDLE state.

In the wireless connection control method according to the first aspect, when the NAS layer of the UE receives a paging message comprising one or more MBS service identifiers from a lower layer, and if the NAS state is a 5GMM-CONNECTED with RRC inactive indication state, the NAS layer enters a 5GMM-IDLE state.

According to a second aspect of the present disclosure, provided is user equipment, comprising: a processor; and a memory, storing instructions, wherein when run by the processor, the instructions perform the wireless connection control method described herein.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
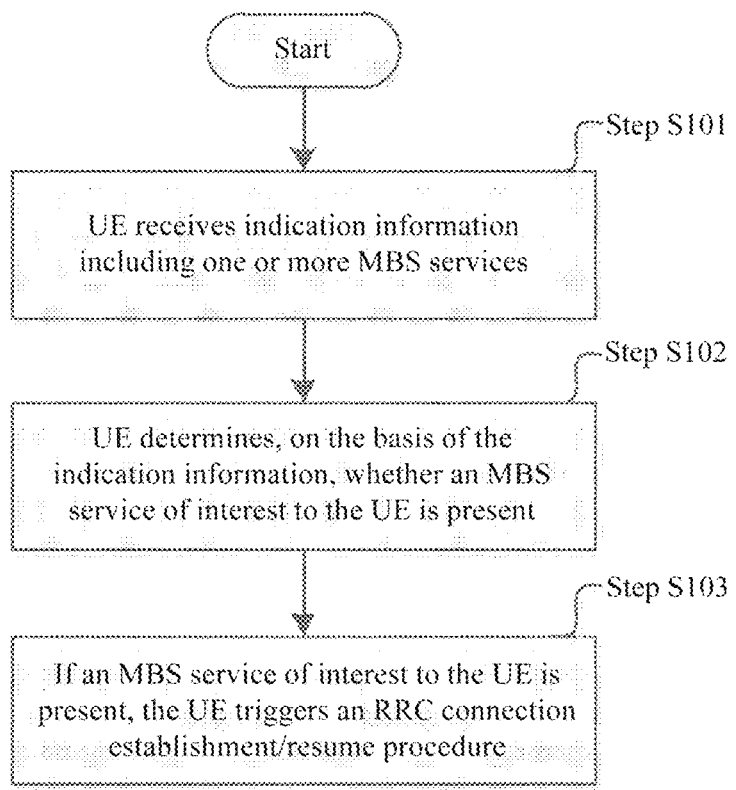
FIG. 1 is a flowchart showing processing of a wireless connection control method according to the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" has an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station or a radio access network are interchangeable. An LTE system may also refer to 5G and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). "Cancel", "release", "delete", "flush", and "clear" are interchangeable. "Execute", "use", and "apply" are interchangeable. "Configure" and "reconfigure" are interchangeable. "Link" and "connection" are interchangeable. "Monitor" and "detect" are interchangeable.

The prior art involved in the embodiment of the present disclosure will be briefly described below.

Paging Mechanism in NR System:

For UEs not in an RRC connected state (in an RRC idle state or in an RRC inactive state RRC_INACTIVE), when a downlink service for a UE reaches a core network, and if the core network determines that the UE is in the idle state, the core network initiates paging for the UE. The core network includes an identifier of the UE (an NG-5G S-TMSI or a 5G S-TMSI) in a paging message, and transmits the paging message to at least one base station. Then, the base station transmits the paging message including the core network identifier NG-5G S-TMSI of the UE via an air interface. Such paging initiated by the core network is referred to as core network (CN) paging. The NR system supports radio access network-based paging for UEs in the RRC_INACTIVE state. When the last serving base station (last serving gNB) of a UE receives, from the core network, downlink data or downlink signaling related to the UE, and if the base station considers that the UE is currently in the RRC_INACTIVE state, the base station initiates paging for the UE within a radio network area (RNA). If the RNA configured for the UE includes another neighboring base station, the last serving base station of the UE may transmit XnAP RAN paging related to the UE to the neighboring base station via an Xn interface between the last serving base station and the neighboring base station, so that the neighboring base station can page the UE in a cell thereof. Such paging initiated by the base station is referred to as radio access network-based paging (RAN paging). For UEs in the RRC_INACTIVE state, the base station identifies a UE and the context thereof by using an inactive state radio network temporary identifier (I-RNTI). During RAN paging, the base station pages the UE by including the I-RNTI in the paging message.

The UE in the RRC_IDLE state can only receive CN paging. The UE, upon receiving paging including a core network identifier of the UE, submits the UE identifier and a possible access type (an accessType information element identifier) in the paging message to an upper layer (a non access stratum (NAS)). The upper layer initiates a corresponding non access stratum procedure accordingly, so as to trigger the RRC layer to perform the RRC procedure to establish or resume a link to the network side.

The UE in the RRC_INACTIVE state determines, according to the type of the UE identifier carried in the paging message, whether the paging is CN paging or RAN paging. If the paging message carries a core network identifier of the UE (i.e., the identifier 5G S-TMSI of the UE allocated by the upper layer), the UE considers that the paging is CN paging, submits the UE identifier and the possible access type (the accessType information element identifier) in the paging message to the upper layer, performs an operation of entering the RRC_IDLE state, and enters the RRC_IDLE state. The upper layer initiates a corresponding non access stratum procedure accordingly, so as to trigger the RRC layer to perform the RRC procedure to establish or resume a link to the network side. If the paging message carries a RAN identifier of the UE (i.e., the I-RNTI, identified as fullI-RNTI), the UE considers that the paging is RAN paging. The RRC layer directly initiates an RRC resume procedure to respond to the paging, and the NAS procedure needs to be triggered by the upper layer.

Access Type Determination in RRC Connection Establishment or Resume Procedure in NR System:

When the upper layer (NAS) requests the UE in the RRC_IDLE state to establish an RRC connection, the RRC layer of the UE initiates an RRC connection establishment procedure. The procedure is triggered due to the request from the upper layer, so that when the upper layer requests RRC connection establishment, the upper layer provides an access type (access category) and one or more access identities. When initiating the procedure, the UE performs an access control (unified access control, UAC) procedure by using the access type and/or the access identities provided by the upper layer. If the UAC result indicates that the access attempt is barred, the RRC connection establishment procedure ends, and an RRC connection cannot be established. Only when the UAC result shows that the access is not barred, will the UE continue the operation of the RRC connection establishment procedure, apply relevant configurations, and initiate an RRC establishment request to the network side.

Regarding the RRC connection resume procedure initiated by the UE in the RRC_INACTIVE state, different access types are determined according to different initiation causes of the RRC connection resume procedure. If the RRC connection resume procedure is triggered to respond to RAN paging, "0" is selected as the access type. If the RRC connection resume procedure is triggered by the upper layer, the access type provided by the upper layer is used. If the RRC connection resume procedure is triggered due to a radio access network-based notification area (RNA) update, it is further determined whether an urgent service is in progress, and if so, the UE selects "2" as the access type, and if not, "8" is selected as the access type.

When the NAS layer initiates a NAS procedure to execute an access request, the access type of the corresponding procedure can be determined by referring to Table 4.5.2.2 in 3GPP protocol specification document TS24.501.

Multicast Broadcast Service Reception Mode in LTE:

The LTE system has two major multimedia broadcast multicast service (MBMS) transmission modes: Multimedia Broadcast multicast service Single Frequency Network (MBSFN) and Single Cell-Point To Multipoint (SC-PTM). In the two mechanisms, the base station broadcasts, via system information and/or control signaling transmitted on a multicast control channel (MCCH) channel, MBMS services supported thereby and scheduling information thereof, such as time-frequency domain resources, etc. By acquiring these MBMS reception configurations, the UE learns which MBMS services are to be carried out or are being carried out in the cell and receives configuration information required for these services, and receives, on the basis of which services are of interest to the UE, the corresponding services of interest on a multicast transport channel (MTCH). In the SC-PTM mechanism, the above MCCH refers to a single cell multicast control channel (SC-MCCH), and the above MTCH refers to a single cell multicast transport channel (SC-MTCH). If control information of an MBMS service has changed, or an MBS session is about to start or end or transmission information thereof is about to change, then the base station may inform the UE via a change notification, such as an MCCH information change notification or an SC-MCCH information change notification transmitted via a physical downlink control channel (PDCCH), or an SC-PTM stop notification via a media access control control element (MAC CE) mode and an SC-MCCH information change notification transmitted via the PDCCH. In the present disclosure, notifications that use RRC signaling, a MAC CE or PDCCH signaling to notify a change in MCCH/SC-MCCH configurations or SC-MTCH or other MBS service-related configurations/information such as session start/session ongoing/session end are collectively referred to as change notifications. For the MBMS, different services/sessions can be distinguished by using different identifiers. In LTE, a temporary mobile group identity (TMGI) is generally used to uniquely identify one MBMS service, and includes a PLMN identifier and a service identifier. The service identifier (serviceId) is used to uniquely identify one MBMS service within one PLMN. The session identifier (sessionId) is an optional MBMS session identifier, and is generally used together with a TMGI to identify transmission or retransmission of a specific MBMS session. When transmitted in a radio network, one MBMS service is associated with one group identifier (Group-Radio Network Temporary Identifier, G-RNTI) for the radio network. In general, in a radio network, MBMS services are in one-to-one correspondence with G-RNTIs. A radio bearer for MBMS services in the LTE is referred to as an MBMS point to multipoint radio bearer (MRB). Parameters corresponding to the MRB are preconfigured (predefined), that is, the parameters do not need to be acquired by the UE from the network side via signaling. When the UE determines that one MBMS service is received, the MRB is established according to predefined parameters, and a corresponding G-RNTI is used to receive MBMS data on the corresponding physical channel. In the SC-PTM mechanism, the above MRB may be replaced with a single cell MRB (SC-MRB). None of the MBMS transmission modes in the LTE supports reception status feedback or feedback-based retransmission.

It can be seen from the above MBMS transmission mechanism in the LTE that the transmission of LTE MBMS services is the same for different RRC states (the RRC connected state or the RRC idle state). That is, the UE in the RRC idle state and the user in the RRC connected state use the same mechanism for MBMS reception. Because all parameters required for MBMS reception are acquired via broadcasting or pre-configuration, the UE can always receive the MBMS no matter which RRC state the UE is in.

Regarding the ongoing NR MBS work item, different from the MBMS mechanism in the LTE, the reliability and grouping functionality of some MBS services are taken into consideration. On the one hand, the UE needs to enter a connected state to perform an MBS session access procedure, so as to be authenticated by the network side to activate reception of the service. On the other hand, some services need to use a transmission mechanism in a connected state, in order to ensure the service quality thereof. That is, from the perspective of RRC, different services have different RRC state requirements. For some MBS services that have no requirements on the UE state, the MBMS transmission mode in the legacy LTE may be employed. For MBS services requiring a connected state, if the UE is in the RRC_IDLE or RRC_INACTIVE state, the UE needs to be connected to the network before receiving the MBS services. After entering the RRC connected state, the UE may receive, via dedicated RRC signaling, corresponding MBS configurations, such as corresponding radio bearer configurations, feedback mechanisms such as channel state indication (CSI) or hybrid automatic repeat request (HARQ) configurations, a feedback-based retransmission service, etc. The UE can establish an MBMS session with the network side by entering the connected state.

The way to wake up the UE in the RRC_IDLE or RRC_INACTIVE state so that the UE enters the connected state to receive a corresponding MBS service may include, but not limited to, the following modes:

Mode 1: the network side (a base station or a core network) wakes up the UE by transmitting a paging message.

Mode 2: the network side wakes up the UE via a change notification.

Mode 3: the network side notifies, via broadcast signaling, the UE of services that the UE needs to enter the RRC connected state to receive, the broadcast signaling being in, for example, system information or in an RRC message transmitted over an MCCH channel. Generally, scheduling information (including time-frequency domain resources and a transmission format of the transmission, etc.) of MBS services that require the RRC connected state is not included in broadcast information.

The signaling in modes 1-3 always includes identifiers for identifying one or more MBS services or MBS sessions, such as a TMGI, a session identifier, a service identifier, etc. No matter which mode is used, when an MBS service corresponding to an identifier therein is a service of interest to the UE, the UE needs to initiate an RRC connection procedure to enter the RRC connected state to receive the MBS service of interest. Therefore, how to perform the RRC connection procedure, more specifically, which protocol layer of the UE initiates the procedure, and how to configure the access type in the RRC procedure are the main problems to be solved in the present disclosure. Further, in mode 1, if RAN paging is used, how to implement the function in mode 1 on the basis of the current RAN paging mechanism also falls within the scope of concern of the present disclosure.

Specific implementations and corresponding embodiments related to the wireless connection control method and corresponding user equipment of the present disclosure are described below. The following implementations or embodiments are merely provided to facilitate understanding of the present invention, and are not used to impose any limitation on the present invention.

FIG. 1 is a flowchart showing processing of a wireless connection control method according to the present disclosure. As shown in FIG. 1, first, in step S101, UE receives indication information including one or more multicast and broadcast service services (MBS services). As described above, the UE may be woken up by means of any one of modes 1-3, that is, receiving corresponding indication information including one or more multicast and broadcast service (MBS) services.

In step S102, the UE determines whether an MBS service of interest to the UE is present on the basis of the above received indication information.

In step S103, if an MBS service of interest to the UE is present, the UE triggers an RRC connection establishment/resume procedure. The UE may trigger the RRC connection establishment/resume procedure via the following methods: for example, an RRC layer may trigger a corresponding RRC connection establishment procedure or RRC resume procedure autonomously, or a NAS layer may initiate a NAS connection procedure, and request or instruct the RRC layer to initiate a corresponding RRC connection establishment/resume procedure. Determination of the access type will be described in detail later.

Several embodiments of the present disclosure are described in detail below. In the following embodiments, for a specific MBS service, the network side can wake up the UE by means of the employed mode, e.g., mode 1, and the UE can determine a corresponding access type on the basis of the requirements of the MBS service, perform UAC on the basis of the access type, and initiate an RRC connection establishment/resume procedure in a corresponding RRC state to enter the connected state.

Embodiment 1

This embodiment provides a method for determining an access type in an RRC connection procedure initiated by UE.

In this embodiment, when the UE, due to the presence of an MBS service of interest to the UE, needs to enter the RRC connected state to acquire corresponding MBS reception configurations or perform an MBS session joining procedure with respect to the network side, an RRC layer triggers a corresponding RRC connection establishment procedure or RRC resume procedure autonomously. Preferably, the UE is in the RRC_INACTIVE state. In the RRC connection establishment/resume procedure autonomously triggered by the RRC layer, the UE selects a predefined specific value as the access type, performs an access control check UAC accordingly, and continues the RRC connection establishment/resume procedure. Preferably, the predefined characteristic access characteristic value is "0".

That is, when the RRC layer initiates the RRC connection establishment/resume procedure, if the procedure is initiated for reception of an MBS service of interest, the RRC layer selects a predefined specific value as the access type, and performs a UAC procedure by using the access type. If the present access attempt is barred, the procedure ends; otherwise, the UE continues the RRC establishment/resume procedure, and transmits an RRC establishment/resume request message to a base station.

The procedure initiated for reception of an MBS service of interest may be implemented on the basis of any one of modes 1-3, but the present invention is not limited thereto. For example, in mode 1, the UE receives a paging message. If an MBS service identifier in the paging message includes an identifier of an MBS service of interest to the UE, the UE initiates an RRC establishment/resume procedure triggered for reception of the MBS service. In mode 2, the UE receives a change notification. If an MBS service (identifier) corresponding to corresponding information or bits in the change notification is an MBS service of interest to the UE, the UE initiates an RRC establishment/resume procedure triggered for reception of the MBS service. In mode 3, the UE receives broadcast signaling. If a list of MBS services required to be received in an RRC connected state indicated in the broadcast signaling includes an identifier of an MBS service of interest to the UE, the UE initiates an RRC establishment/resume procedure triggered for reception of the MBS service.

Embodiment 2

This embodiment provides an RRC connection establishment/resume procedure initiation method applied to UE in an RRC_INACTIVE state.

In this embodiment, the corresponding signaling in modes 1-3 includes one or more MBS service identifiers. If the one or more MBS service identifiers include an identifier of an MBS service of interest to the UE, and if the UE is in the RRC_INACTIVE state, then the UE considers that receiving the signaling in modes 1-3 including the identifier of the MBS service of interest to the UE is equivalent to receiving legacy RAN paging including a fullI-RNTI thereof, and initiates a corresponding RRC connection resume message using the same subsequent procedures as those of the existing RAN paging. That is, during initiation of the RRC connection resume procedure, "0" is selected as the access type, and UAC is performed. If the access control result indicates that the access is not barred, then an RRC resume request message is transmitted to the network side.

Embodiment 3

This embodiment provides another RRC connection establishment/resume procedure implementation method used when UE requests to enter a connected state for MBS service reception.

In this embodiment, a NAS layer triggers a NAS signaling connection establishment procedure or a NAS signaling procedure (e.g., a service request procedure, a registration procedure, a notification procedure, etc., which is not limited herein) for reconstructing user plane resources, so as to further request an RRC layer to initiate an RRC connection establishment/resume procedure at the RRC layer.

Step 1: the UE receives indication information in the signaling including one or more MBS service identifiers in modes 1-3. The indication information is used to indicate that an MBS service corresponding to an MBS service identifier included therein is about to begin, or related configurations of the MBS service, such as scheduling information (e.g., time domain and/or frequency domain resources) are changed, or to indicate that reception of the MBS service needs to be performed when connection to the network side is established.

For mode 1 and mode 2, in general, the above reception operation is performed on the RRC layer of the UE. For mode 2, if the change notification is in the form of a MAC CE or L1 signaling (e.g., downlink control information borne on a PDCCH), the operation of the step is performed on a MAC layer or a physical layer of the corresponding UE.

Step 2: the RRC layer of the UE submits the indication information and the one or more MBS service identifiers in the received signaling to an upper layer (the NAS layer).

If the receiving operation in step 1 is performed on the MAC layer or the physical layer, then step 2 further includes submitting, by the MAC layer or the physical layer of the UE, the indication information and the one or more MBS service identifiers in the received signaling to the upper layer. In an implementation method, the upper layer here is the NAS layer. In another implementation method, the upper layer here is the RRC layer. In this case, when the RRC layer receives the above information from the MAC layer or the physical layer, the RRC layer needs to relay or forward the same to the NAS layer.

Preferably, the operation in step 2 is performed when the UE determines that the MBS service identifiers in the received signaling include an identifier of an MB S service of interest to the UE. Preferably, the one or more MBS service identifiers submitted by the RRC layer of the UE to the NAS layer include an identifier of an MBS service of interest to the UE.

Step 3: upon receiving the above indication information and the one or more MBS service identifiers from the lower layer, the NAS layer initiates a NAS connection procedure, and requests or instructs the RRC layer to initiate a corresponding RRC connection establishment/resume procedure, and meanwhile, the NAS layer determines an access type and an establishment/resume cause (RRC establishment/resume cause) corresponding to this connection establishment procedure, and provides the same to the lower layer for use in the RRC procedure.

Step 4: upon receiving the request from the NAS layer, the RRC layer initiates the RRC connection establishment/resume procedure, and when initiating this procedure, the RRC layer selects the access type provided by the upper layer in step 3, and performs an access control check UAC on this basis. If the access is not barred, the UE initiates an RRC establishment request message or an RRC resume request message, and configures the establishment cause or resume cause in the message to be the cause provided by the upper layer in step 3.

Embodiment 4

This embodiment provides an RRC state determination method used when an RRC connection establishment/resume procedure for MBS reception is being initiated.

The content of this embodiment is described below by using mode 1 as an example.

In a method, when the RRC layer of the UE receives a paging message including one or more MBS service identifiers, and if the RRC state of the UE is the RRC_INACTIVE state, the UE remains in this state, that is, the UE does not perform an operation of entering the RRC_IDLE state. When the NAS layer of the UE receives a paging message including one or more MBS service identifiers from the RRC layer, and if the NAS layer is in the 5GMM-CONNECTED with RRC inactive indication state, the NAS layer remains in this state, that is, the NAS layer does not enter the 5GMM-IDLE state.

In a method, when the RRC layer of the UE receives a paging message including one or more MBS service identifiers, and if the RRC state of the UE is the RRC_INACTIVE state, the UE always enters the RRC_IDLE state, and performs an operation of entering the RRC_IDLE state. When the NAS layer of the UE receives a paging message including one or more MBS service identifiers from the RRC layer, and if the NAS layer is in the 5GMM-CONNECTED with RRC inactive indication state, the NAS layer enters the 5GMM-IDLE state. Preferably, when the one or more MAS service identifiers include an identifier of an MBS service of interest to the UE, that is, when the UE needs to establish a connection with the network side for reception of the MBS service of interest, the UE performs the above state transition. The 5GMM-CONNECTED with RRC inactive indication state means that the UE is in 5GMM-CONNECTED mode over 3GPP access at the NAS layer, and is in the RRC_INACTIVE state at the access stratum (AS) layer. In the 5GMM-IDLE state, the UE is not connected to a 5G core network.

In a method, the paging message including one or more MBS service identifiers also includes one or more UE-specific identifiers associated with one or more MBS services, and the UE-specific identifier is, for example, the fullI-RNTI, the 5G S-TMSI, or the like. When the RRC layer of the UE receives the above paging message, if the one or more MBS service identifiers include an identifier of an MBS service of interest to the UE and/or if the UE-specific identifiers are not included in a list of UE-specific identifiers associated with MBS services, then the UE enters the RRC_IDLE state if the RRC state of the UE is the RRC_INACTIVE state, and performs an operation of entering the RRC_IDLE state. When the NAS layer of the UE receives a paging message including one or more MBS service identifiers from the RRC layer, if the one or more MBS service identifiers include an identifier of an MBS service of interest to the UE and/or the UE-specific identifiers are not included in the list of UE-specific identifiers associated with MBS services, and if the NAS layer is in the 5GMM-CONNECTED with RRC inactive indication state, then the NAS layer enters the 5GMM-IDLE state.

Embodiment 5

This embodiment provides a RAN paging method implemented on a base station.

In this embodiment, if base station 1 transmits a paging message for an MBS service to base station 2, a RAN PAGING message transmitted by base station 1 to base station 2 includes one or more MBS service identifiers (i.e., a list of MBS service identifiers). Preferably, the RAN PAGING message is a non-specific UE-associated message transmitted via an Xn interface. That is, the RAN PAGING message is not associated with a specific UE. Preferably, the MBS service identifier is a TMGI. Optionally, the MBS service identifier further includes a session identifier. Alternatively, the MBS service identifier may also be a G-RNTI. Upon receiving the above RAN paging, base station 2 transmits a paging message including the above MBS service identifiers in a cell associated therewith.

Embodiment 6

In this embodiment, user equipment (UE) and base station (BS) according to the present disclosure is described. FIG.

Figure 2:
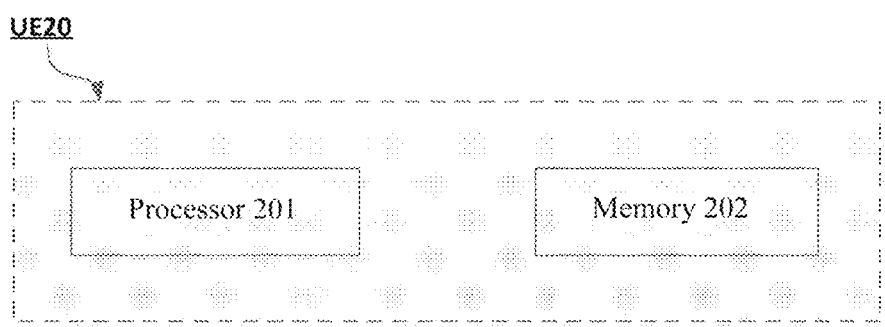
FIG. 2 shows a block diagram showing user equipment (UE) according to the present disclosure.
Figure 3:
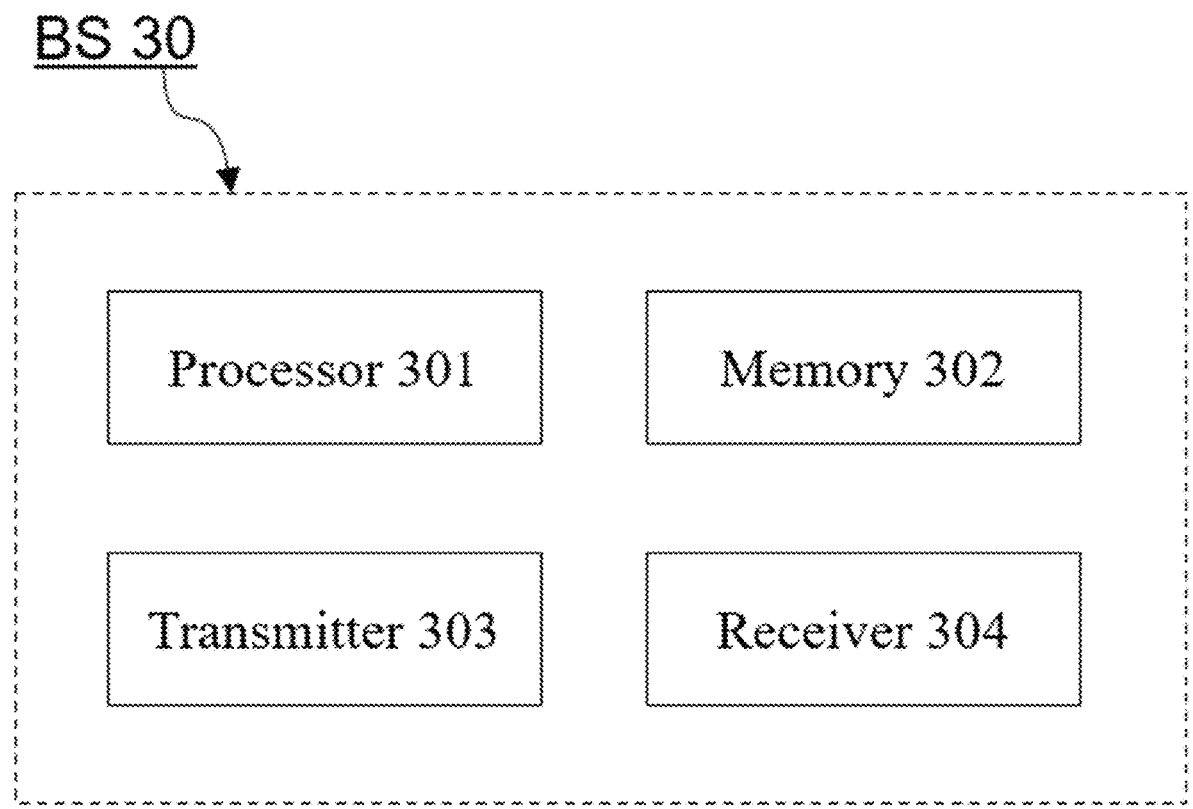
FIG. 3 shows a block diagram showing base station (BS) according to the present disclosure.

2 is a block diagram showing user equipment (UE) according to the present invention, and FIG. 3 is a block diagram showing base station (BS) according to the present invention. As shown in FIG. 2, user equipment (UE) 20 includes a processor 201 and a memory 202. As shown in FIG. 3, base station (BS) 30 includes a processor 301 and a memory 302. The processors 201 and 301 may each include, for example, a microprocessor, a microcontroller, an embedded processor, and the like. The memories 202 and 302 may each include, for example, a volatile memory (such as a random access memory (RAM)), a hard disk drive (HDD), a non-volatile memory (such as a flash memory), or other memories. Each of the memories 202 and 302 stores program instructions. When run by one of the processors 201 and 301, the instructions can perform the various methods, such as the wireless connection control method, etc., described above in detail in the present invention. As further shown in FIG. 3, the base station (BS) 30 further includes a transmitter 303 and a receiver 304, which can define an Xn interface between base station (BS) 30 and a neighboring base station, as described in detail above.

In the present disclosure, some different embodiments can cooperate with each other. If not otherwise specified, concepts or definitions are applicable among the embodiments.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A Base Station (BS), comprising a processor configured to:
   receive, from a second base station via Xn interface, a Radio Access Network (RAN) paging message for Multicast and broadcast Service (MBS) including an identifier related to MBS which indicates a Temporary Mobile Group Identity (TMGI), wherein the RAN paging message is not a UE-associated message; and
   transmit, to a user equipment, a paging message including the TMGI.

2. A communication method for a base station (BS), the method comprising:
   receiving, from a second base station via Xn interface, a Radio Access Network (RAN) paging message for Multicast and broadcast Service (MBS) including an identifier concerning MBS which indicates a Temporary Mobile Group Identity (TMGI), wherein the RAN paging message is not a UE-associated message; and transmitting, to a user equipment, a paging message including the TMGI.

* * * * *